US009282237B2

(12) United States Patent
Tamer

(10) Patent No.: US 9,282,237 B2
(45) Date of Patent: Mar. 8, 2016

(54) MULTIFOCAL IRIS RECOGNITION DEVICE

(71) Applicant: Schlage Lock Company LLC, Indianapolis, IN (US)

(72) Inventor: Samir Moustaffa Tamer, San Jose, CA (US)

(73) Assignee: Schlage Lock Company LLC, Indianapolis, IN (US)

( * ) Notice: Subject to any disclaimer, the term of this patent is extended or adjusted under 35 U.S.C. 154(b) by 0 days.

(21) Appl. No.: 14/334,469

(22) Filed: Jul. 17, 2014

(65) Prior Publication Data

US 2016/0021294 A1  Jan. 21, 2016

(51) Int. Cl.
  G06K 9/00 (2006.01)
  H04N 5/232 (2006.01)
  G06K 9/62 (2006.01)
  G07C 9/00 (2006.01)

(52) U.S. Cl.
  CPC ........ *H04N 5/23212* (2013.01); *G06K 9/00604* (2013.01); *G06K 9/00617* (2013.01); *G06K 9/6202* (2013.01); *G07C 9/00134* (2013.01)

(58) Field of Classification Search
  USPC ........... 382/115, 117, 209, 218, 278; 340/5.1, 340/5.2, 5.52, 5.8, 5.82
  See application file for complete search history.

(56) References Cited

U.S. PATENT DOCUMENTS

| 6,540,392 | B1 | 4/2003 | Brathwaite |
| 6,753,919 | B1 | 6/2004 | Daugman |
| 7,095,901 | B2 | 8/2006 | Lee et al. |
| 7,116,803 | B2 * | 10/2006 | Lemelson et al. ............ 382/118 |
| 7,146,027 | B2 * | 12/2006 | Kim et al. ..................... 382/117 |
| 7,382,902 | B2 | 6/2008 | Tisse et al. |
| 7,554,598 | B2 | 6/2009 | Togino |
| 7,652,685 | B2 | 1/2010 | Wach et al. |
| 7,797,549 | B2 * | 9/2010 | Main et al. ..................... 713/186 |
| 7,925,058 | B2 | 4/2011 | Lee et al. |
| 7,936,392 | B2 | 5/2011 | Ng et al. |
| 8,045,001 | B2 | 10/2011 | Nakao et al. |
| 8,064,647 | B2 | 11/2011 | Bazakos et al. |
| 8,090,157 | B2 * | 1/2012 | Hamza ............... G06K 9/00281 382/115 |
| 8,131,013 | B2 * | 3/2012 | Ikeda ................. G06K 9/00248 382/103 |
| 8,215,774 | B2 * | 7/2012 | Korb .................... A61B 3/0025 351/205 |
| 8,289,440 | B2 | 10/2012 | Knight et al. |
| 8,364,971 | B2 * | 1/2013 | Bell et al. ....................... 713/186 |
| 8,457,367 | B1 | 6/2013 | Sipe et al. |
| 8,529,063 | B2 * | 9/2013 | Bonnin .................. A61B 3/113 351/209 |
| 8,553,948 | B2 * | 10/2013 | Hanna ........................... 382/117 |
| 8,749,620 | B1 | 6/2014 | Knight et al. |

(Continued)

OTHER PUBLICATIONS

International Search Report; International Searching Authority; International PCT Application No. PCT/US2015/040903; Oct. 15, 2015; 2 pages.

(Continued)

*Primary Examiner* — Yosef Kassa
(74) *Attorney, Agent, or Firm* — Taft Stettinius & Hollister LLP

(57) ABSTRACT

An exemplary iris-recognition method includes capturing a raw light field photograph of a face including an eye, locating the eye within the raw light field photograph, and rendering, from the raw light field photograph, an image focused on the eye. The image may include an eye portion including the eye. The method may further include extracting an iris template from the eye portion, determining a degree of match between the template and an authorized iris template, and performing an action in response to the degree of match.

26 Claims, 4 Drawing Sheets

(56) References Cited

U.S. PATENT DOCUMENTS

| | | |
|---|---|---|
| 2007/0057211 A1 | 3/2007 | Bahlman et al. |
| 2007/0274570 A1 | 11/2007 | Hamza |
| 2009/0278922 A1 | 11/2009 | Tinker et al. |
| 2010/0110275 A1 | 5/2010 | Mathieu |
| 2010/0202667 A1 | 8/2010 | Ren et al. |
| 2012/0154536 A1 | 6/2012 | Stoker et al. |
| 2014/0161325 A1 | 6/2014 | Bergen |

OTHER PUBLICATIONS

Written Opinion; International Searching Authority; International PCT Application No. PCT/US2015/040903; Oct. 15, 2015; 6 pages.

Ng, Ren; "Digital Light Field Photography", Dissertation, Department of Computer Science, Stanford University, Jun. 2006.

* cited by examiner

MULTIFOCAL IRIS RECOGNITION DEVICE

TECHNICAL FIELD

The present invention generally relates to iris recognition devices, and more particularly but not exclusively to access control systems including iris recognition devices.

BACKGROUND

Some security and access control systems utilize biometric authentication protocols where a user's biometric data is compared to a set of authorized biometric data to selectively permit access to an access-controlled environment. Each human iris exhibits a pattern that varies from person to person, and it is generally accepted that each person possesses a unique iris pattern. Due to the uniqueness of the patterns and the difficulty in duplicating or forging iris patterns, iris recognition is generally recognized as providing a higher degree of security than other biometric authentication protocols such as fingerprint recognition.

Present approaches to iris recognition suffer from a variety of limitations, including limitations associated with ease of use and cost. Therefore, a need remains for further improvements in iris recognition devices and systems and methods for using the same.

SUMMARY

An exemplary iris-recognition method includes capturing a raw light field photograph of a face including an eye, locating the eye within the raw light field photograph, and rendering, from the raw light field photograph, an image focused on the eye. The image may include an eye portion including the eye. The method may further include extracting an iris template from the eye portion, determining a degree of match between the template and an authorized iris template, and performing an action in response to the degree of match. Further embodiments, forms, features, aspects, benefits, and advantages of the present application shall become apparent from the description and figures provided herewith.

DETAILED DESCRIPTION OF ILLUSTRATIVE EMBODIMENTS

Figure 1:
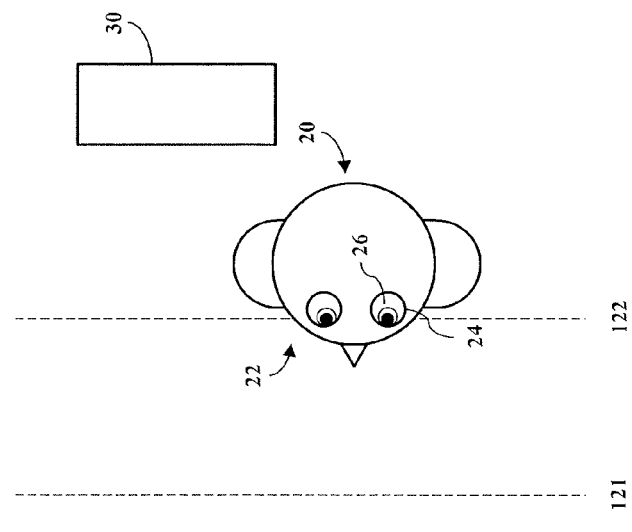
FIG. 1 depicts a schematic illustration of an access control system according to one embodiment.
Figure 1:
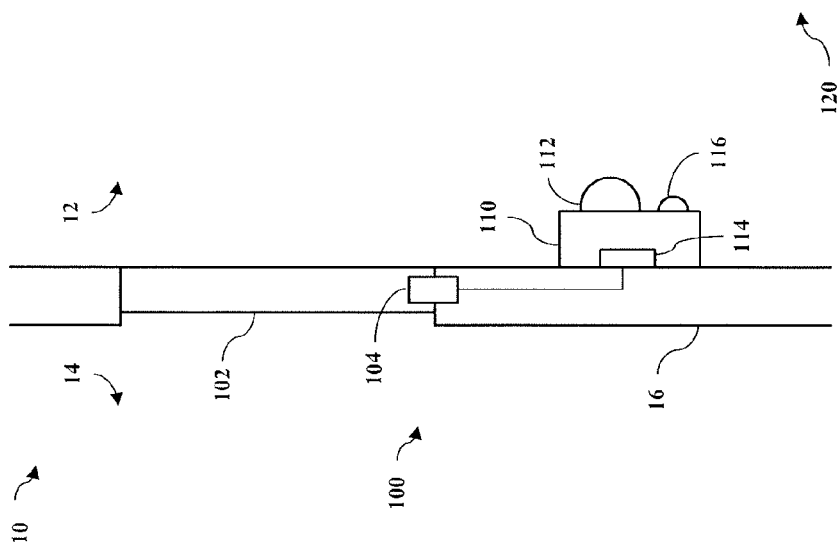

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one form of an access control system 100 is installed in an access-controlled region or environment 10 including an unsecured area 12, a secured area 14, and a wall or divider 16 separating the unsecured area 12 from the secured area 14. The access control system 100 also includes a door 102 installed on the wall 16, an electrically-operable lock 104, and an iris-recognition device 110 that controls operation of the lock 104.

The iris-recognition device 110 is mounted on the unsecured side of the wall 16, and includes a light field camera 112, and a controller 114 which controls operation of the system 100. In certain forms, the camera 112 may be a commercially available light field camera such as, for example, a LYTRO M01-series light field camera. As is known in the art, light field cameras such as the camera 112 are operable to detect a light field using an approach involving determining the amount and direction of light arriving at a sensor located at a focal plane. The two-dimensional position of light in the focal plane is detected along with information characterizing the direction from which the light arrived at particular locations in the plane. The camera 112 may use lenses that focus an image on a photosensor array located along an imaging plane in order to sample the space of light rays. An output from the photosensor array may be used with computational functions (e.g., at a processor internal and/or external to the camera) to render images such as, for example, by computing photographs that are focused at different depths.

The iris-recognition device 110 may further include a sensor 116 in communication with the controller 114 such that the iris-recognition device 110 is operable to detect the presence of a user 20 in the space 120. As described in further detail below, the sensor 116 may take a variety of forms. For example, the sensor 116 may comprise a motion sensor, an optical sensor, a button, a touch pad, a keypad, a credential reader, or a biometric sensor.

Generally speaking, the camera 112 includes a microlens array and a standard two-dimensional image sensor, and is operable to capture a raw light field photograph including information relating to the light field within the camera 112. For example, when the camera 112 is pointed toward the space 120, the light field will include light reflected into the camera 112 from the space 120. Thus, the light field in the camera 112 is defined by the objects positioned in the space 120, and the raw light field photograph may be considered a raw light field photograph of the space 120.

Figure 2:
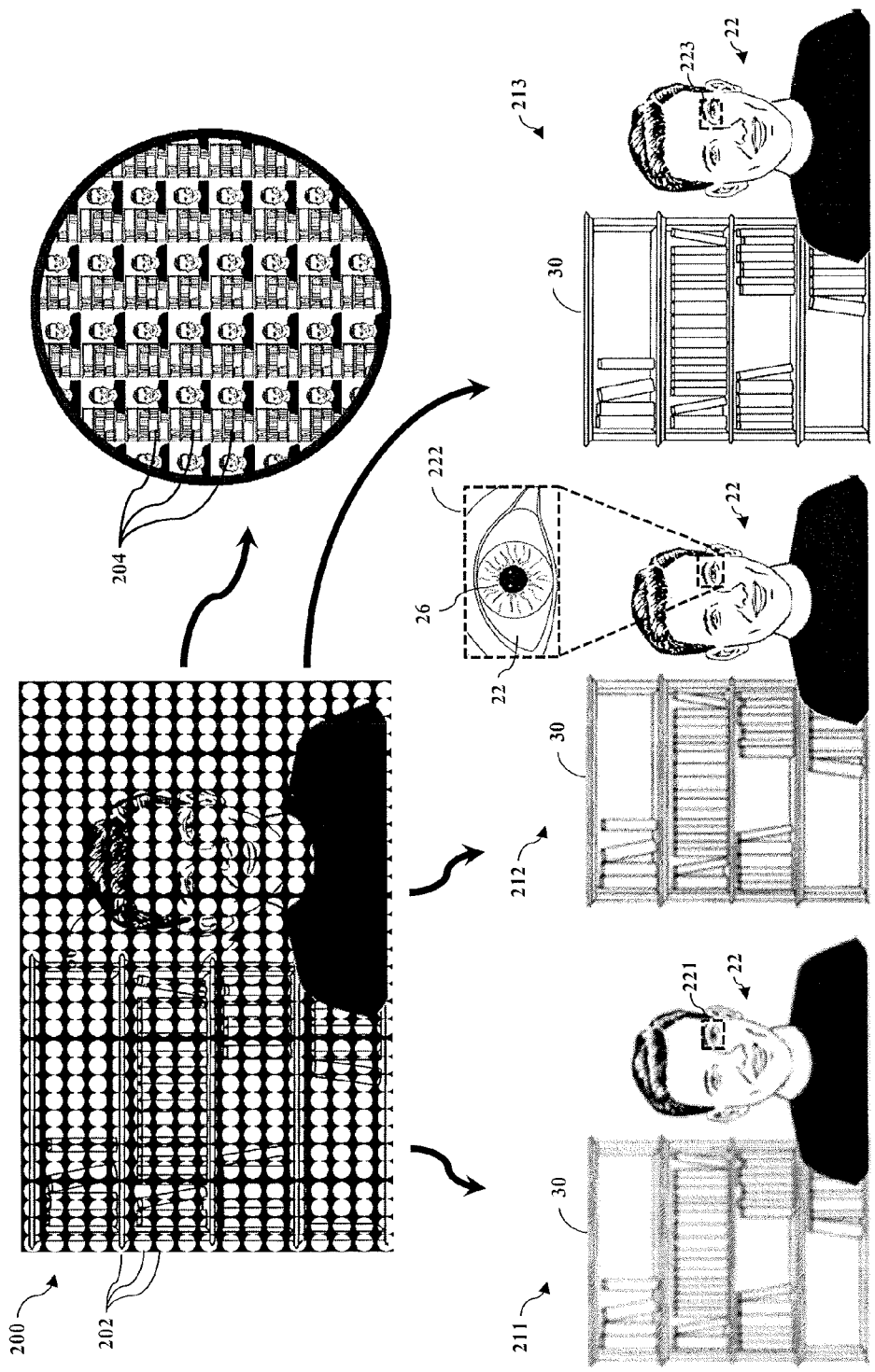
FIG. 2 illustrates a raw light field photograph and a plurality of images rendered therefrom

With additional reference to FIG. 2, the raw light field photograph 200 includes an array of microlens images 202, each of which corresponds to one of the microlenses in the microlens array. The microlens images 202 are circular due to the fact that each is a picture of the round aperture of the lens, as viewed by the photosensor through the corresponding microlens. In other words, the raw light field photograph 200 is a grid of the microlens images 202, where each of the microlens images 202 shows the light arriving at the photosensor array from different locations of the main lens aperture.

Using data from the raw light field photograph 200, the controller 114 (or another processor, such as one included in the camera 112) may execute processes and algorithms to render a variety of images. For example, the controller 114 may render a plurality of sub-aperture images 204 by transposing the pixels in the raw light field photograph 200. For instance, the sub-aperture images 200 may be created by selecting a pixel coordinate, extracting from each of the microlens images 202 the pixel at the selected coordinate, and compiling the extracted pixels in an arrangement corresponding to the microlens image 202 from which the pixels were extracted.

The controller 114 may also render a plurality of two-dimensional images 211-213 from the raw light field photograph 200, wherein each of the images 211-213 has a different focus. For example, a first image 211 may have a focal depth corresponding to a first plane 121 in the space 120, and a second image 212 may have a focal depth corresponding to a second plane 122. As illustrated in FIG. 2, misfocus blur increases with increasing distance from the selected plane, as would be seen in a conventional photograph. For example, in the image 211 focused on the first plane 121, both the user's face 22 and a background object 30 are out of focus, and the background object 30 comprises a greater misfocus blur than the user's face 22. As should be appreciated, different focal depths may be selected to focus upon different subjects in the scene. For example, in order to focus on the user's face 22, the second image 212 may have a focal depth corresponding to the second plane 122, such that the user's face 22 is in focus and the background object 30 is out of focus.

In certain embodiments, the controller 114 may be further operable to create an image with an expanded depth of field, such that a plurality of objects having different distances from the camera 112 are in focus. For example, the third image 213 has an extended depth of field, and both the user's face 22 and the background object 30 are in focus. Further details regarding the processes and algorithms utilized to render images may be found, for example, in the following documents, the contents of each of which are hereby incorporated by reference: U.S. Pat. No. 7,936,392 to Ng et al., U.S. Pat. No. 8,289,440 to Knight et al., U.S. Pat. No. 8,749,620 to Knight et al., and "Digital Light Field Photography", Dissertation of Ren Ng, Department of Computer Science, Stanford University, June 2006.

Figure 3:
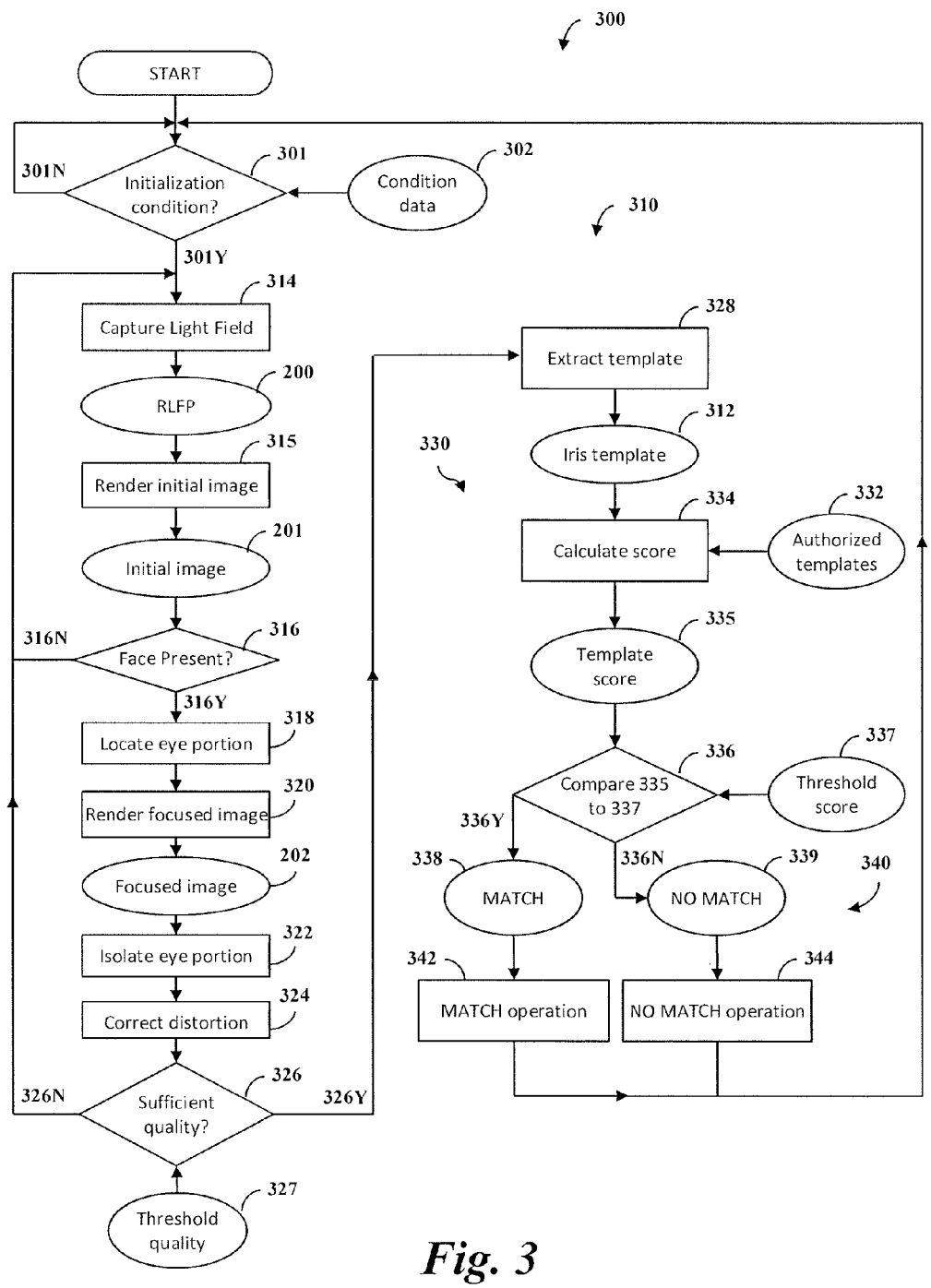
FIG. 3 is a schematic flowchart of an exemplary control process according to one embodiment.

With additional reference to FIG. 3, an illustrative iris recognition process 300 is depicted in the form of a schematic flow diagram. The process 300 may be utilized in connection with an iris recognition device such as, for example, the above-described device 110, and may be performed in whole or in part by the controller 114. The process 300 generally includes an acquisition process 310 in which an iris template 312 is acquired from an eye 24, an authentication process 330 in which the template 312 is compared to an authorized iris template 332 to determine whether the extracted template 312 matches the authorized template 332, and an action process 340 in which an operation 342 is performed based at least in part on the result of the authentication process 330.

The schematic flow diagram of FIG. 3 and the related description which follows provides an illustrative embodiment of performing procedures for controlling access in a system, such as the system 100 illustrated in FIG. 1 and described above. Operations illustrated and described herein are understood to be exemplary only, and operations may be combined or divided, and added or removed, as well as re-ordered in whole or part, unless stated explicitly to the contrary herein. Additionally, certain operations may be implemented by a computer (such as the controller 114) via executing a computer program product on a non-transient computer readable storage medium, where the computer program product comprises instructions causing the computer to execute one or more of the operations, or to issue commands to other devices to execute one or more of the operations.

Additionally, while the process 300 is described herein with respect to the access-controlled region 10 and the system 100, it should be understood that the process 300 may be performed in association with similar or different systems.

That is to say, while the illustrated system 100 is a physical access control system which controls access to the secured area 14, it is also contemplated that the iris-recognition device 110 may be utilized to control access to a different form of an access-controlled element or environment, which may be tangible or intangible. By way of non-limiting example, an intangible access-controlled element or environment may comprise digital data, and the iris-recognition device 110 may be utilized to permit only authorized users to access the data.

The process 300 may begin with an initializing operation 301 including determining whether an initialization condition has occurred. In the illustrated embodiment, the controller 114 is in communication with the sensor 116, and interprets the initialization condition based on condition data 302 received from the sensor 116. In certain embodiments, the sensor 116 may be configured to detect the presence of a user within the space 120, and may comprise a motion detector, an infrared sensor, and/or an optical sensor. In such embodiments, the condition data 302 may relate to motion or body heat within the space 120, and the controller 114 may interpret such motion or body heat as the initialization condition.

In other embodiments, the sensor 116 may comprise an authenticating sensor such as a credential reader or biometric sensor. For example, if the sensor 116 comprises a credential reader, the condition data 302 may relate to a credential in the area of the device 110, and the controller 114 may interpret the presence of an authorized credential as the initialization condition. If the sensor 116 comprises a biometric sensor such as a fingerprint scanner, the condition data 302 may relate to a biometric input, and the controller 114 may interpret an authorized biometric input as the initialization condition.

In certain embodiments, the sensor 116 may be a user-identifying sensor configured to identify a user. In such embodiments, the controller 114 may interpret a user being identified as the initialization condition. For example, the sensor 116 may comprise a credential reader, and the controller 114 may identify the user associated with a presented credential. In another form, an identifying sensor may comprise a biometric sensor such as a fingerprint scanner, and the controller 114 may identify the user associated with the biometric data.

If the initialization condition has occurred, the initialization operation 301 yields a positive result 301Y, and the process 300 continues to the acquisition process 310. If the initialization condition has not occurred, the initialization operation 301 yields a negative result 301N, and the initializing operation 301 may repeat. It is also contemplated that the process 300 need not necessarily include the initializing operation 301, and may proceed directly to the acquisition process 310.

The acquisition process 310 begins with a capturing operation 314 which includes capturing a raw light field photograph 200 of the space 120. The process 310 may then continue to a rendering operation 315 which includes rendering an initial image having an initial focal depth. For example, if the initial focal depth is selected as corresponding to the first plane 121, the initial image may be the first image 211. In certain forms, the initial focal depth may be a predetermined focal depth, such as one corresponding to a distance at which a user typically stands when interfacing with the system 100. In other forms, the initial focal depth may be selected based upon one or more criteria, such as the distance by which the user 20 is currently separated from the camera 112, which may, for example, be detected by the sensor 116.

The process 300 may then proceed to a face-detecting operation 316 which includes determining whether a human face 22 is present in the initial image 211. Because face-detection algorithms are relatively insensitive to focus problems, the presence, size, position, and orientation of the face 22 may be detected in the initial image 211, despite the fact that the face 22 may be blurred. If a face 22 is not detected, the face-detecting operation 316 yields a negative result 316N, and the process 300 may return to the capturing operation 314 or the initializing operation 301. If a face 22 is detected in the initial image 211, the face-detecting operation 316 yields a positive result 316Y, and the process 300 continues to a locating operation 318.

The locating operation 318 includes locating at least one of the user's eyes 24 in the initial image 211, and defining that portion of the image as an eye portion 221. The process 300 then advances to a focusing operation 320 which includes rendering a focused image 212 in which the eye portion is in focus. In the illustrated form, the focused image 212 has a focal depth corresponding to the second plane 122, although it is also contemplated that the focused image may be rendered with an extended depth of field, such as the image 213, in which both the eye portion 223 and the background image 30 are in focus.

While the acquisition process 310 has been described hereinabove as performing various operations on the initial image 211, it is also contemplated that one or more of the operations may be performed on another image or on the raw light field photograph 200 itself. For example, the face-detecting operation 316 and/or the locating operation 318 may be performed on the raw light field photograph 200 as a whole, or on one or more of the sub-aperture images 204. In such embodiments, the initial image 211 need not necessarily be rendered; that is to say, the operation 315 may be omitted. Once the focused image 212 including the focused eye portion 222 is rendered, the process 300 may advance to an isolating operation 322.

The isolating operation 322 includes isolating or extracting the focused eye portion 222 from the focused image 212. In certain embodiments, the camera 112 may have a wide-angle or fisheye lens incorporated into the optical path to provide a wider field of view. In these and other embodiments, the process 300 may further include a correcting operation 324, which includes performing a geometric transformation on the eye portion 214 in a known manner to correct geometric distortion.

Once the focused eye portion 222 has been extracted and optionally corrected, the process 300 may continue to a quality-checking operation 326. The operation 326 includes determining whether the iris 26 captured in the extracted eye portion 222 is of sufficient quality for accurate analysis, for example, by determining a quality score of the image of the iris 26, and comparing the quality score to a threshold quality 327. If the focused eye portion 222 is of insufficient quality (326N) (e.g., if the user 20 is too far away from the camera 112 or is not looking toward the camera 112), the process 300 may return to the capturing operation 314. If the eye portion 222 is of sufficient quality (326Y), the process 300 continues to an extracting operation 328 which includes extracting the iris template 312 from the image of the iris 26 in the eye portion 222.

Once the iris template 312 has been extracted, the process 300 advances to the authentication process 330 which may include a score-calculating operation 334 and a score-comparing operation 336. The score-calculating operation 334 includes comparing the iris template 312 to at least one authorized template 332 (e.g., an iris template of a user who is authorized to access the secured area 14), which may be stored, for example, on the device 110, on a server in communication with the device 110, on a credential presented by the user 20, or elsewhere. The operation 334 further includes calculating a value indicative of the degree of match between the extracted template 312 and each of the at least one authorized templates 332. In one embodiment, the score-calculating operation 334 may include calculating a similarity value indicative of the similarity of the extracted template 312 to the authorized template 332, with a higher similarity value indicating a greater degree of match. In another embodiment, the score-calculating operation 334 may include calculating a distance value indicative of the difference between the extracted template 312 and the authorized template 332, with a lower distance value indicating a greater degree of match. The operation 332 further includes storing the value indicating the greatest match (i.e., the highest similarity value or the lowest distance value) as the template score 335.

In certain embodiments, the score-calculating operation 334 may include comparing the iris template 312 to a single authorized template 332. For example, in embodiments in which the condition data 302 includes information relating to the identity of an authorized user (e.g., a user associated with a presented credential or a scanned fingerprint), the operation 334 may include comparing the iris template 312 to only the authorized template 332 associated with that user 20. The operation 334 may further include selecting the authorized template 332 from a plurality of authorized templates in response to the identity of the user 20.

After the score 335 has been calculated, the process 300 continues to a comparing operation 336 which includes comparing the score 335 to a threshold score 337. As noted above, in embodiments in which the score-calculating operation 334 includes calculating the similarity values, the score 335 is the highest of the similarity values. In such embodiments, when the score 335 is greater than or equal to the threshold score 337 (336Y), the result of the authenticating process 330 is a MATCH 338. If the score 335 is less than the threshold score 337 (336N), the result of the authenticating process 330 is a NO MATCH 339. In embodiments in which the score-calculating operation 334 includes calculating the distance values, the score 335 is the lowest of the distance values. In such embodiments, the comparing operation 336 may include determining the MATCH 338 when the score 335 is less than or equal to the threshold score 337, and determining the NO MATCH 339 when the score 335 is greater than the threshold score 337.

The process 300 then continues to the action process 340 which includes performing one of a first operation 342 and a second operation 344 based at least in part upon the result of the authentication process 330. More specifically, the action process 340 includes performing a MATCH operation 342 in response to the MATCH result 338, and performing a NO MATCH operation 344 in response to the NO MATCH result 339.

In the illustrated form, the MATCH operation 342 may include opening the door 102 or unlocking the lock 104, and the NO MATCH operation 344 may include logging the unsuccessful attempt, recording the iris template 312, waiting for a predetermined delay period prior to restarting the process 300, and/or triggering an alarm. It is also contemplated that in other embodiments, such as those in which the process 300 is utilized to control digital access, the MATCH operation 342 may include granting data access to a server, file, or program, and the NO MATCH operation 344 may include denying such access. Once the action process 340 is complete, the process 300 may restart, for example, by returning to the initializing operation 301.

In certain embodiments, the system 100 and method 300 may provide a single layer of security in the form iris recognition. In other embodiments, the iris recognition may be utilized in conjunction with additional layers of security, such as authentication of a credential or additional biometric data. For example, the MATCH operation 342 may include comparing the template 312 to a credential presented to a credential reader, and may further include granting access only if the credential is authorized and/or associated with the same user as the authorized template 332 which the extracted template 312 was determined to match.

As is known in the art, many face-detection algorithms are relatively insensitive to geometric distortion. As such, if the images 211-213 exhibit geometric distortion (i.e., if the camera 112 includes a wide angle or fisheye lens), the face-detecting operation 316 may be performed on the focused image 212 prior to the correcting operation 324, on the raw light field photograph 200 as a whole, or on one or more of the sub-aperture images 204. Contrastingly, certain comparing algorithms which may be utilized in the score-calculating operation 334 may be more sensitive to distortion. Due to the fact that the iris template 312 is extracted from the selected eye portion 222 and is independent of the other portions of the image 212, the isolating operation 322 may be performed prior to the correcting operation 324. Thus, the computationally expensive geometric transformation may be run on only the isolated eye portion 222 (as opposed to the entire image 212), thereby reducing the processing power required to perform the correcting operation 324.

As noted above, the illustrated process 300 is provided as an example, and unless noted otherwise, operations may be added, removed, or rearranged. For example, an alternative process may include capturing the raw light field photograph 200 such that it includes the face 22, and locating the eye 24 within the raw light field photograph 200. The alternative process may further include rendering from the raw light field photograph 200 an image 212 focused on the eye 24, and extracting from the eye portion 222 of the image 212 the iris template 312. The alternative process may further include determining a degree of match between the iris template 312 and the authorized iris template 332, and performing an action in response to the degree of match exceeding a threshold value.

Figure 4:
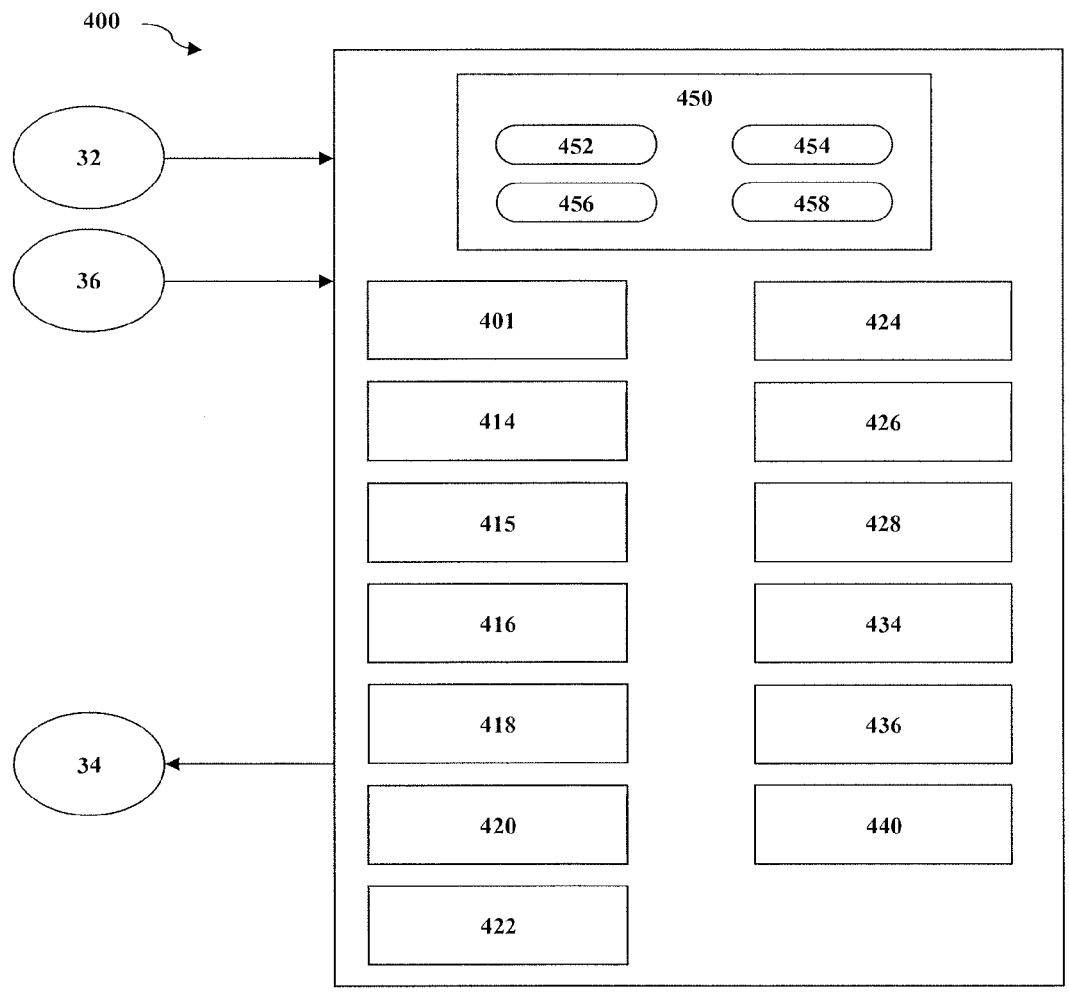
FIG. 4 is a schematic illustration of an exemplary controller for use with the access control system illustrated in FIG. 1.

With additional reference to FIG. 4, an exemplary controller 400 is structured to perform an iris-recognition process such as the above-described process 300, and may be utilized in connection with the iris-recognition device 110. For example, the above-described controller 114 may be provided in the form of the controller 400, or may be structured and configured in a similar manner. The controller 400 includes a plurality of modules 401 et seq., each of which is configured to perform a specific function during operation of the controller 400. The function performed by each of the modules 401 et seq. may correspond to the above-described operation 301 et seq. indicated with a similar reference numeral.

The description set forth herein emphasizes the independence of the aspects of the controller 400, and illustrates one grouping of operations and responsibilities of the controller 400. Other groupings that execute similar overall operations are understood within the scope of the present application. Modules may be implemented in hardware and/or software on computer readable medium, and modules may be distributed across various hardware or software components. More specific descriptions of certain embodiments of controller operations are included above with reference to FIG. 3. Certain operations described herein may include receiving values by any method known in the art, including at least receiving values from a datalink or network communication, receiving an electronic signal (e.g., a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 400 is also operable to receive image data 32 (e.g., from the camera 112) to issue commands 34 (e.g., to the lock 104 and/or the camera 112), and may further be configured to receive sensor data 36 (e.g., from the sensor 116). The controller 400 includes a data storage module 450 which stores data, such as initialization data 452 relating to the initialization condition, quality data 454 relating to the threshold quality 327, authentication data 456 relating to the authorized templates 332, and score data 458 relating to the threshold score 337. The controller 400 may further include an initialization module 401 structured to receive the sensor data 36, and to determine the initialization condition when the sensor data 36 meets criteria stored in the initialization data 452.

The controller 400 further includes an image module 414 configured to receive, convert, and/or store the image data 32 such that the raw light field photograph 200 can be accessed and utilized by other modules. A rendering module 415 is configured to implement computational functions using the image data 32 to render a two-dimensional image, such as the initial image 211. A detection module 416 is configured to determine whether a face 22 is present in the initial image 211 (or alternatively, in the raw light field photograph 200 or one or more of the sub-aperture images 204) utilizing one or more facial-detection techniques known in the art such as, for example, the Viola-Jones method. The controller 400 also includes a locating module 418 structured to locate an eye portion utilizing one or more eye-locating techniques known in the art such as, for example, those comprising an edge-detection algorithm. The locating module 418 may locate the eye portion within the raw light field photograph 200, or in an image rendered from the raw light field photograph 200, such as a sub-aperture image 204 or the initial image 211.

A focusing module 420 is configured to render a focused image 212 in which the eye portion 222 is in focus (e.g., by rendering the image 212 focused at the plane 122 or by rendering the image 213 with an extended depth of field), and an isolation module 422 is configured to isolate or extract the eye portion 222 from the focused image 212. The controller 400 may further include a correction module 424 configured to correct the eye portion 222 for geometrical distortion, for example if the camera 112 utilizes a wide angle or fisheye lens.

The controller 400 may further include a quality module 426 which compares the quality of the selected eye portion 222 to the quality data 454. The quality module 426 may command the camera 112 to capture another raw light field photograph 200 in response to a first result of the comparing (e.g., the result 326N), and may initialize operation of an extraction module 428 in response to a second result of the comparing (e.g., the result 326Y). The extraction module 428 is configured to extract the iris template 312 from the focused image 212, and more particularly from the selected eye portion 222.

The controller 400 also includes a score module 434 which compares the iris template 312 to one or more authorized templates 332 stored in the authentication data 456, and calculates the score 335 for the extracted template 312. The score module 434 may compare the iris template to each of the authorized templates 332 stored in the authentication data 456, less than all of the authorized templates 332 stored in the authentication data 456, or only a single authorized template 332. For example, in embodiments in which the sensor 116 is a user identifying sensor, the score module 434 may compare the extracted template 312 to only the one or more templates 332 associated with the user identified by the sensor 116. A comparison module 436 compares the score 335 to the threshold score data 458, and determines whether the template 312 is authorized based at least in part upon the comparing.

The controller 400 further includes a command module 440 which is structured to issue commands 34, for example, to another element of the access control system 100. The command module 440 may be configured to issue a first of the commands 34 in response to the score comparing positive result 336Y, and to issue a second of the commands 34 in response to the score comparing negative result 336N. The system 100 may perform the MATCH operation 342 in response to the first command, and may perform the NO MATCH operation 344 in response to the second command. The command module 440 may also be configured to issue a third of the commands 34, for example in response to the initialization condition and/or the first result of the comparing performed by the quality module 426. In response to the third command, the camera 112 may capture a second raw light field photograph 200 and transmit a second set of image data 32 to the controller 400.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    performing a capturing operation including capturing a raw light field photograph of a space;
    performing a face-detection operation including detecting whether a face is present in the space;
    performing a locating operation including locating an eye portion of the face;
    performing a focusing operation including rendering, from the raw light field photograph, a focused image comprising a focused eye portion;
    performing an extracting operation including extracting an iris template from the eye portion of the focused image;
    performing an authenticating operation including determining whether the extracted iris template matches an authorized iris template; and
    performing a predetermined operation in response to a first result of the determining, and not performing the predetermined operation in response to a second result of the determining.

2. The method of claim 1, wherein the determining comprises calculating a score indicative of a match between the extracted iris template and the authorized iris template, and comparing the calculated score to a threshold score.

3. The method of claim 1, wherein the face-detecting operation includes detecting the face in one of the raw light field photograph and an image rendered from the raw light field photograph.

4. The method of claim 3, wherein the face-detecting operation includes detecting the face in a sub-aperture image rendered from the raw light field photograph.

5. The method of claim 1, further comprising:
    performing, prior to the locating operation, a rendering operation including rendering from the raw light field photograph an initial image; and
    wherein the locating operation includes locating the eye portion in the initial image.

6. The method of claim 5, further comprising:
    after the focusing operation, performing a quality-comparing operation including comparing a quality of the focused eye portion to a threshold quality; and
    performing the extracting operation in response to a first result of the quality-comparing operation.

7. The method of claim 6, further comprising returning to the capturing operation in response to a second result of the quality-comparing operation.

8. The method of claim 6, further comprising, intermediate the locating operation and the quality-comparing operation, isolating the selected eye portion and correcting geometric distortion of the isolated eye portion.

9. The method of claim 1, wherein the predetermined operation includes granting access to an access-controlled environment.

10. The method of claim 9, wherein the access-controlled environment comprises a physical access-controlled environment, and the predetermined operation includes permitting physical access to the access-controlled environment.

11. The method of claim 9, wherein the access-controlled environment comprises a secured region, and the predetermined operation includes unlocking or opening a door associated with the secured region.

12. The method of claim 9, further comprising performing a second predetermined operation in response to a second result of the authenticating operation.

13. The method of claim 12, wherein the second predetermined operation includes at least one of logging the second result, recording the extracted iris template, and triggering an alarm.

14. The method of claim 1, further comprising detecting an initialization condition, and performing the capturing operation in response to the initialization condition.

15. A system, comprising:
    a light field camera operable to capture a raw light field photograph; and
    a controller connected to the light field camera, the controller including:
        an image module configured to receive data relating to the raw light field photograph;
        a rendering module configured to render from the data relating to the raw light field photograph a two-dimensional image;
        a locating module configured to locate within the two-dimensional image an eye portion including a human eye;
        a focusing module configured to render a focused image including a focused eye portion;

an extraction module configured to extract an iris template from the focused eye portion;

a score module configured to calculate a score of the iris template based at least in part on a degree of match between the extracted iris template and a second iris template;

a comparison module configured to compare the calculated score to a threshold score; and a command module configured to issue a first command in response to a comparison between the calculated score and a threshold score.

16. The system of claim 15, wherein the focusing module is configured to select a focal depth at which the eye portion is in focus, and to render the focused image with the selected focal depth.

17. The system of claim 15, wherein the focusing module is configured to render the focused image with an extended depth of field.

18. The system of claim 15, further comprising an access control system configured to permit access to an access controlled environment in response to the first command.

19. The system of claim 15, further comprising an electronic lock configured to transition from a locked state to an unlocked state in response to the first command.

20. The system of claim 15, wherein the raw light field photograph is a raw light field photograph of a space;

wherein the system further comprises a sensor configured to detect a presence of a user within the space;

wherein the command module is further configured to issue a second command in response to the presence of the user within the space; and wherein the light field camera is configured to capture the raw light field photograph in response to the second command.

21. The system of claim 15, further comprising a user-identifying sensor configured to identify a user and to issue a user identity signal;

wherein the controller further comprises a data storage module storing a plurality of authorized iris templates; and wherein the score module is further configured to select the second iris template from the plurality of authorized iris templates in response to the user identity signal.

22. A method, comprising:

capturing a raw light field photograph of a face including an eye having an iris;

locating the eye;

rendering from the raw light field photograph an image focused on the eye, wherein the image includes a focused eye portion in which the eye is in focus;

extracting from the focused eye portion a template of the iris;

determining a degree of match between the template and an authorized iris template; and performing an action in response to the degree of match between the template and an authorized iris template.

23. The method of claim 22, wherein the determining includes calculating a distance value indicative of difference between the template and the authorized iris template, and the performing includes performing the action in response to the distance value not exceeding a threshold value.

24. The method of claim 22, wherein the determining includes calculating a similarity value indicative of similarity between the template and the authorized iris template, and the performing includes performing the action in response to the similarity value exceeding a threshold value.

25. The method of claim 22, wherein the locating includes locating the eye in one of the raw light field photograph and an image rendered from the raw light field photograph.

26. The method of claim 25, wherein the locating includes locating the eye in a sub-aperture image rendered from the raw light field photograph.

* * * * *